United States Patent
Kawakami et al.

(10) Patent No.: US 8,938,493 B2
(45) Date of Patent: Jan. 20, 2015

(54) SIMULATION SYSTEM

(75) Inventors: Yusuke Kawakami, Kanagawa (JP); Shinichiro Mikami, Chiba (JP)

(73) Assignees: Sony Corporation (JP); Sony Computer Entertainment Inc. (JP)

( * ) Notice: Subject to any disclaimer, the term of this patent is extended or adjusted under 35 U.S.C. 154(b) by 692 days.

(21) Appl. No.: 12/991,177

(22) PCT Filed: Aug. 12, 2009

(86) PCT No.: PCT/JP2009/064222
§ 371 (c)(1),
(2), (4) Date: Feb. 15, 2011

(87) PCT Pub. No.: WO2010/064471
PCT Pub. Date: Jun. 10, 2010

(65) Prior Publication Data
US 2011/0153734 A1 Jun. 23, 2011

(30) Foreign Application Priority Data
Dec. 5, 2008 (JP) .................. 2008-311554

(51) Int. Cl.
*G06F 15/16* (2006.01)
*A63F 13/30* (2014.01)

(52) U.S. Cl.
CPC ........... *A63F 13/12* (2013.01); *A63F 2300/534* (2013.01); *A63F 2300/638* (2013.01); *A63F 2300/8011* (2013.01)
USPC .......................................... 709/203; 717/135

(58) Field of Classification Search
CPC ... H04L 67/38; A63F 13/12; A63F 2300/534; A63F 2300/5533; A63F 2300/64; G06F 9/54
USPC ........................................... 709/203; 717/135
See application file for complete search history.

(56) References Cited

U.S. PATENT DOCUMENTS

| | | | |
|---|---|---|---|
| 6,628,287 B1* | 9/2003 | Duda et al. ............ | 345/475 |
| 8,126,994 B2* | 2/2012 | Richards ................ | 709/223 |
| 2007/0168168 A1* | 7/2007 | Maegawa et al. ..... | 703/6 |

FOREIGN PATENT DOCUMENTS

| | | |
|---|---|---|
| JP | 9244984 A | 9/1997 |
| JP | 11212818 A | 8/1999 |

(Continued)

OTHER PUBLICATIONS

Japanese Office Action for Application No. 2008-311554 dated May 8, 2012, with partial English translation.

(Continued)

*Primary Examiner* — Jonathan C Teixeira Moffat
*Assistant Examiner* — Eyob Hagos
(74) *Attorney, Agent, or Firm* — Lerner, David, Littenberg, Krumholz & Mentlik, LLP (57) ABSTRACT

Provided is a simulation system capable of reducing a deviation that occurs in simulation results between a client and a server. In the simulation system, a server (2) notifies a client (3) of event information regarding behaviors of one or a plurality of objects, which is obtained as results of executing simulations, along with timing information indicating timings of the behaviors, and the client (3) executes, based on the event information notified from the server (2), a simulation regarding behaviors of at least part of the objects. Also in the simulation system, the client (3) executes the simulation at a timing delayed from the execution of the simulation by the server (2), and causes the behavior of the object corresponding to the event information to occur at a timing determined according to the timing information.

8 Claims, 5 Drawing Sheets

(56) References Cited

FOREIGN PATENT DOCUMENTS

| | | | | |
|---|---|---|---|---|
| JP | 2000262743 | * | 9/2000 | ............ A63F 13/00 |
| JP | 2000262743 A | | 9/2000 | |
| JP | 2007160015 A | | 6/2007 | |
| JP | 2007301046 A | | 11/2007 | |

OTHER PUBLICATIONS

International Search Report, PCT/JP2009/064222, dated Nov. 17, 2009.

Preliminary Report on Patentability and Written Opiniont, PCT/JP2009/064222, dated Jul. 14, 2011.

* cited by examiner

| TIME COUNTER | EVENT INFORMATION |
|---|---|
| 0 | ○○○○○○ |
| 1 | ○○○○○ |
| 2 | ○○○○○○ |
| 3 | ○○○○ |
| 4 | ○○○○○ |
| 5 | ○○○ |
| 6 | ○○○○ |
| 7 | ○○ |
| 8 | |
| 9 | ○ |

SIMULATION SYSTEM

TECHNICAL FIELD

The present invention relates to a simulation system in which each of a server and a client executes a simulation regarding behaviors of one or a plurality of objects, and also to a client constituting the simulation system, a control method therefor, a program, and an information storage medium.

BACKGROUND ART

For example, in an online game, simulation processing, such as a physical simulation, is sometimes executed in order to determine behaviors of one or a plurality of objects. Generally, such a simulation is executed by a server, whereas a client receives execution results of the simulation processing from the server, and then presents the execution results to a user. In this case, for the purpose of, for example, reducing a communication amount, simulation processing, which is similar to the simulation processing executed by the server, is also executed on the side of the client with regard to at least part of the objects based on information regarding the behaviors of the objects (for example, positions, speeds, accelerations, and the like of the objects), which is notified from the server.

DISCLOSURE OF THE INVENTION

Problems to be Solved by the Invention

In the technology of the related art described above, if a delay occurs in communication when event information is notified from the server to the client, there is a fear that a deviation in simulation execution results occurs between the server and the client. For example, there is a case in which a plurality of events occurring at the same timing on the side of the server arrive at the client with deviations in terms of time. As a result, it is recognized that the events have occurred at different timings on the side of the client. Further, there is a case in which pieces of event information arrive at the client in an order different from the order in which events have occurred on the side of the server. As a result, it is recognized that the events have occurred in the order different from the order in the server. In particular, in a physical simulation or the like, even if a deviation, which occurs in event occurrence timing, may be small when the event information arrives at the client, a significant difference may eventually occur in simulation execution results between the side of the server and the side of the client.

Figure 6:
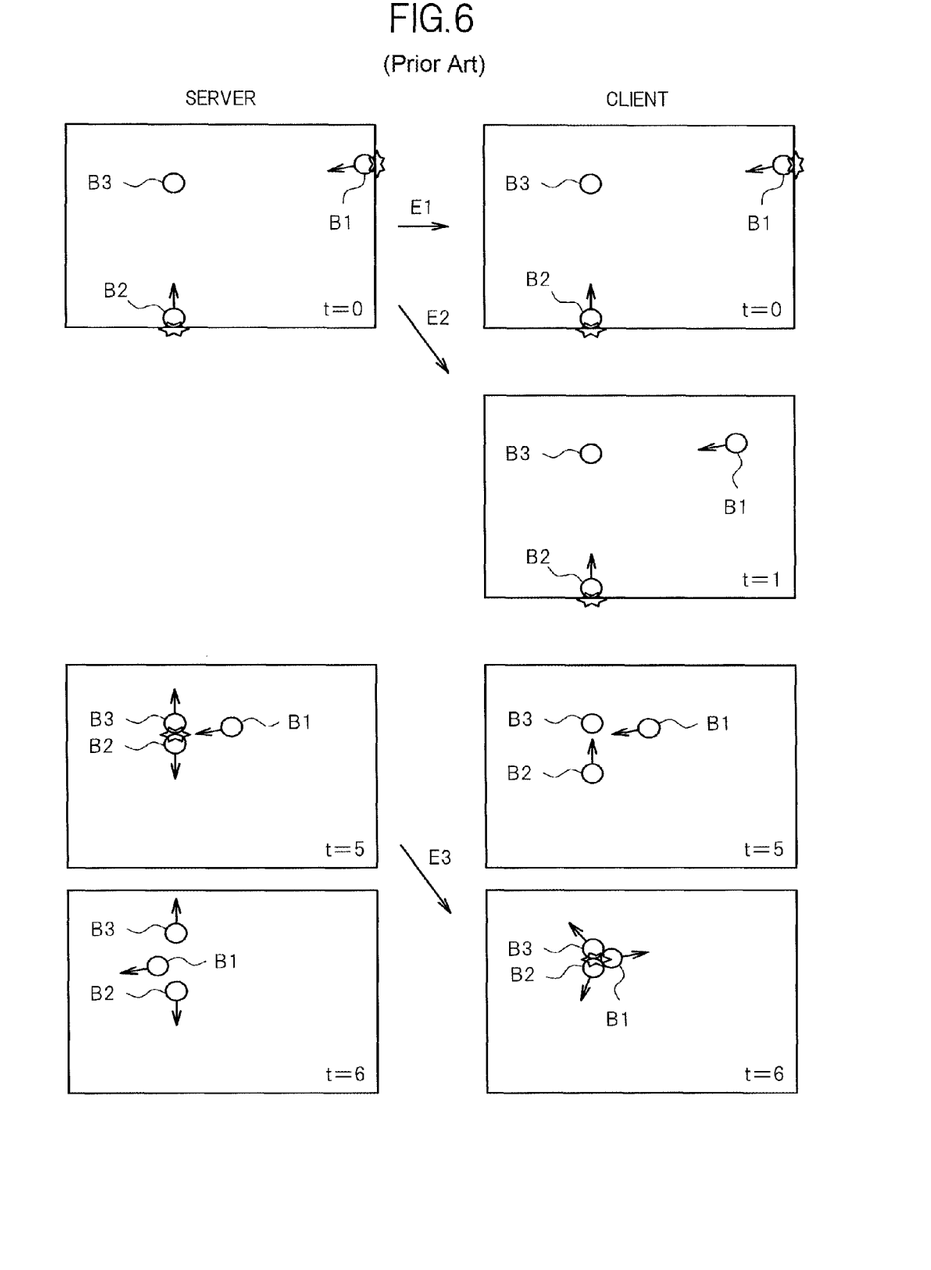
FIG. 6 A diagram illustrating an example of simulation results obtained by a simulation system according to the related art.

FIG. 6 is a diagram illustrating an example of such a problem, and illustrates changes in state within a virtual space (here, corresponding to a billiard table), which is a simulation subject of a simulation system for simulating behaviors of balls in a billiard game. Specifically, in the example of this figure, three balls B1, B2, and B3 disposed within the billiard table are set as objects to be simulated, and the behaviors of those balls in the virtual space are computed through the physical simulation. Further, in the example of the figure, an event, in which a ball collides against a wall (cushion) of the billiard table or against another ball and changes its moving direction or moving speed, is notified from the server to the client as event information E.

Each rectangular area of FIG. 6 illustrates a state of the virtual space at a given time point, which is calculated through a simulation of the server or the client. Specifically, rectangular areas on the left-hand side of the drawing sheet represent simulation results obtained on the side of the server, and rectangular areas on the right-hand side of the drawing sheet represent simulation results obtained on the side of the client. Further, the value of a variable t shown in each rectangular area is a value of a time counter which indicates the elapse of time in the virtual space. With the elapse of time in the simulation processing, the value of the time counter t is incremented by one at predetermined intervals (for example, 1/30 seconds). In other words, in FIG. 6, the lower section of the figure represents a state in which time has further elapsed.

Referring to FIG. 6, on the side of the server, at a timing of t=0, there occur events E1 and E2 in which the ball B1 and the ball B2 collide against walls and bounce back, respectively. It should be noted that, in the figure, the arrows attached to the balls indicate the moving directions of the balls at the respective time points. Here, it is assumed that, of the events that have occurred on the side of the server, the event E1 is immediately notified to the client, whereas the event E2 is notified to the client with a delay of a time duration corresponding to one time counter value. In this case, the client simulates the subsequent movements of the balls, assuming that the ball E1 bounces back against the wall at the timing of t=0, and that the ball B2 bounces back against the wall with a delay at a timing of t=1.

As illustrated in the figure, on the side of the server, there occurs an event E3 in which the ball B2 and the ball B3 collide against each other at a timing of t=5. After that, at a timing of t=6, the ball B1 passes through between the ball B2 and the ball B3 which have bounced against each other. On the other hand, at the client, the ball B2 starts to move not at the timing of t=0 but at the timing of t=1, and hence, unlike the simulation result on the side of the server, a collision between the ball B2 and the ball B3 does not occur at the timing of t=5, but a collision therebetween occurs at a timing of t=6. It should be noted that, here, the event E3 is assumed to arrive at the client with a delay as well. Thus, at the timing of t=5, a deviation in the state regarding the ball B2 between the server and the client is not resolved. As a result, on the side of the client, at the timing at which the ball B2 and the ball B3 collide against each other, the ball B1 also collides with the balls B2 and B3. Consequently, the subsequent movements of the balls are completely different from those on the side of the server. After that, this deviation may be resolved when a new event, such as an event in which the balls collide against the walls, occurs on the side of the server, and is then notified to the side of the client. However, the display at the client in such a case becomes unnatural due to, for example, the fact that the balls instantaneously have moved to completely different places within the billiard table all of a sudden.

In view of the above-mentioned circumstances, the present invention has been made, and therefore has an object to provide a simulation system capable of reducing a deviation that occurs in simulation results between a client and a server, and also provide a client constituting the simulation system, a control method therefor, a program, and an information storage medium.

Means for Solving the Problems

According to the present invention, there is provided a simulation system including a client and a server, in which: the server includes server simulation execution means for executing a simulation regarding behaviors of one or a plurality of objects disposed in a virtual space, and event information notification means for notifying the client of event information regarding a behavior of the object, which is obtained as a result of the simulation, along with timing information indicating a timing of the behavior; the client includes event information reception means for receiving the event information notified from the server, and client simulation execution means for executing, based on the received event information, a simulation regarding behaviors of at least part of the one or the plurality of objects in the virtual space; and the client simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information.

In the above-mentioned simulation system, the event information reception means may store each piece of the received event information in, of a plurality of event queues each secured for each piece of the timing information, an event queue corresponding to the timing information received along with the event information, and the client simulation execution means may execute the simulation for each of the plurality of event queues in a manner that behaviors of the objects occur at the same timing, the behaviors of the objects corresponding to a plurality of pieces of the event information which are stored in the each of the plurality of event queues.

Further, in the above-mentioned simulation system, the client may further include user instruction information notification means for receiving an instruction of a user regarding a behavior of any one of the one or the plurality of objects, and notifying the server of user instruction information indicating a content of the instruction. The server simulation execution means may cause the behavior of the object corresponding to the user instruction information to occur at a timing of receiving the notified user instruction information from the client. The event information notification means may notify the client of event information regarding the behavior of the object corresponding to the notified user instruction information, along with timing information indicating a timing at which the server simulation execution means receives the user instruction information.

Further, in the above-mentioned simulation system, the plurality of event queues may be secured for a number corresponding to a time duration by which the execution of the simulation by the client is delayed compared to the execution of the simulation by the server.

Further, in the above-mentioned simulation system, the client simulation execution means may delay, compared to the execution of the simulation by the server, the execution of the simulation regarding the at least part of the one or the plurality of objects by a time duration determined according to a required time taken for data transmission from the server to the client.

Further, in the above-mentioned simulation system, the client may further include simulation result presentation means for presenting, to the user, an execution result of the simulation executed by the client simulation execution means, and the simulation result presentation means may perform, in a case where the user instruction information notification means has received the instruction of the user, a predetermined display according to the received instruction prior to presentation of a simulation result corresponding to the user instruction information.

Further, according to the present invention, there is provided a client which is connected to a server for executing a simulation regarding behaviors of one or a plurality of objects disposed in a virtual space. The client includes event information reception means for receiving event information regarding a behavior of the object, which is obtained as a result of the simulation, along with timing information indicating a timing of the behavior from the server, and simulation execution means for executing, based on the received event information, a simulation regarding behaviors of at least part of the one or the plurality of objects in the virtual space, in which the simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information.

Further, according to the present invention, there is provided a control method for a client connected to a server for executing a simulation regarding behaviors of one or a plurality of objects disposed in a virtual space. The control method for a client includes an event information reception step of receiving event information regarding a behavior of the object, which is obtained as a result of the simulation, along with timing information indicating a timing of the behavior from the server, and a simulation execution step of executing, based on the received event information, a simulation regarding behaviors of at least part of the one or the plurality of objects in the virtual space, in which the simulation execution step includes executing the simulation regarding the behaviors of the at least part of the one or the plurality of objects at a timing delayed from the execution of the simulation by the server, and causing the behavior of the object corresponding to the event information to occur at a timing determined according to the timing information notified along with the event information.

Further, according to the present invention, there is provided a computer-readable information storage medium having a program stored therein, the program causing a client, which is connected to a server for executing a simulation regarding behaviors of one or a plurality of objects disposed in a virtual space, to function as event information reception means for receiving event information regarding a behavior of the object, which is obtained as a result of the simulation, along with timing information indicating a timing of the behavior from the server, and simulation execution means for executing, based on the received event information, a simulation regarding behaviors of at least part of the one or the plurality of objects in the virtual space, in which the simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information.

BEST MODE FOR CARRYING OUT THE INVENTION

Hereinbelow, with reference to the drawings, detailed description is given of an embodiment of the present invention.

Figure 1:
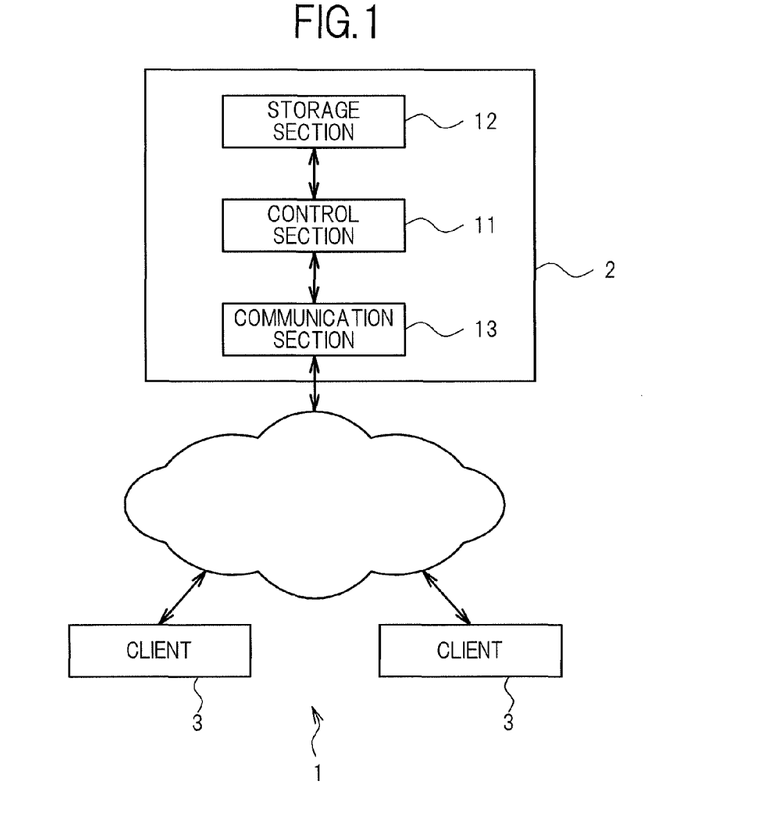
FIG. 1 A schematic diagram illustrating an overview of a simulation system according to an embodiment of the present invention.

As illustrated in FIG. 1, a simulation system 1 according to this embodiment includes a server 2 and a plurality of clients 3. The server 2 and each of the clients 3 are connected to each other via a communication network, such as the Internet.

The server 2 is an information processing device, such as a server computer, and, as illustrated in FIG. 1, includes a control section 11, a storage section 12, and a communication section 13.

The control section 11 includes a CPU and the like, and executes various types of information processing according to programs stored in the storage section 12. A specific example of the processing executed by the control section 11 according to this embodiment is described later.

The storage section 12 includes a memory device, such as a RAM or a ROM, a hard disk, and the like, and stores the programs executed by the control section 11 and various types of data. Further, the storage section 12 also operates as a working memory for the control section 11.

The communication section 13, which is a communication interface, receives data arriving from an outside via the communication network, and outputs the data to the control section 11. Further, according to an instruction given by the control section 11, the communication section 13 transmits various types of data to other information processing devices connected thereto via the communication network.

Figure 2:
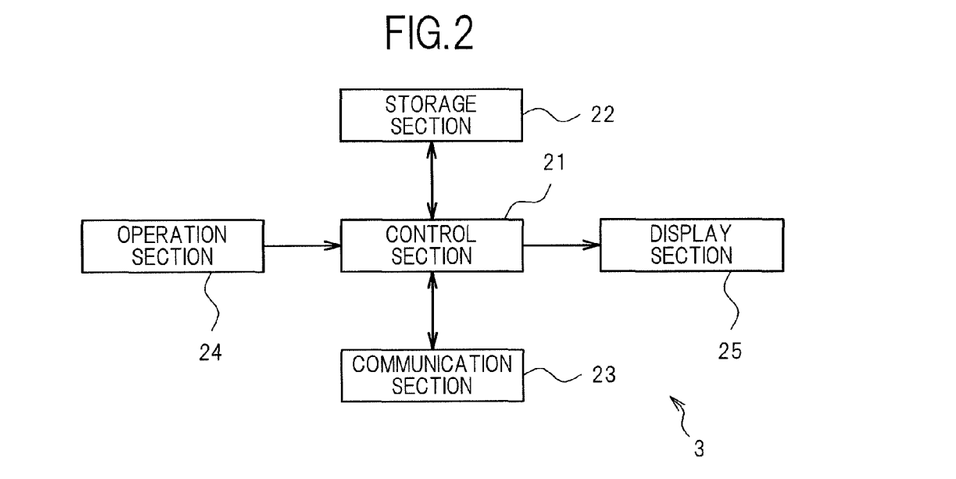
FIG. 2 A configuration block diagram illustrating a configuration example of a client according to the embodiment of the present invention.

The client 3 is, for example, an information processing device, such as a home-use game machine or a personal computer, and, as illustrated in FIG. 2, includes a control section 21, a storage section 22, a communication section 23, an operation section 24, and a display section 25. The control section 21, the storage section 22, and the communication section 23 may have the same configurations as the control section 11, the storage section 12, and the communication section 13, respectively.

The operation section 24, which is a controller of a home-use game machine, a keyboard, a mouse, or the like, receives an operation instruction from a user, and outputs the operation instruction to the control section 11. Further, the display section 25 is a home-use television set, a liquid crystal display, or the like, and presents various types of information to the user according to instructions given from the control section 11.

Hereinbelow, description is given of a specific example of functions implemented by the simulation system 1 according to this embodiment. In this embodiment, the server 2 computes behaviors of one or a plurality of objects disposed in a virtual space through simulation processing, such as a physical simulation. It should be noted that objects to be subjected to a simulation may include objects that are operable by users of the clients 3, or may include objects other than those objects. The server 2 notifies each client 3 of event information regarding the behaviors of the objects, which is obtained as a result of the simulation. Based on the event information notified from the server 2, the client 3 executes at least part of the simulation processing that is being executed by the server 2, and then presents the behaviors of the objects in the virtual space which are obtained as results thereof to the user through a method, such as displaying the behaviors on a screen of the display section 25.

Figure 3:
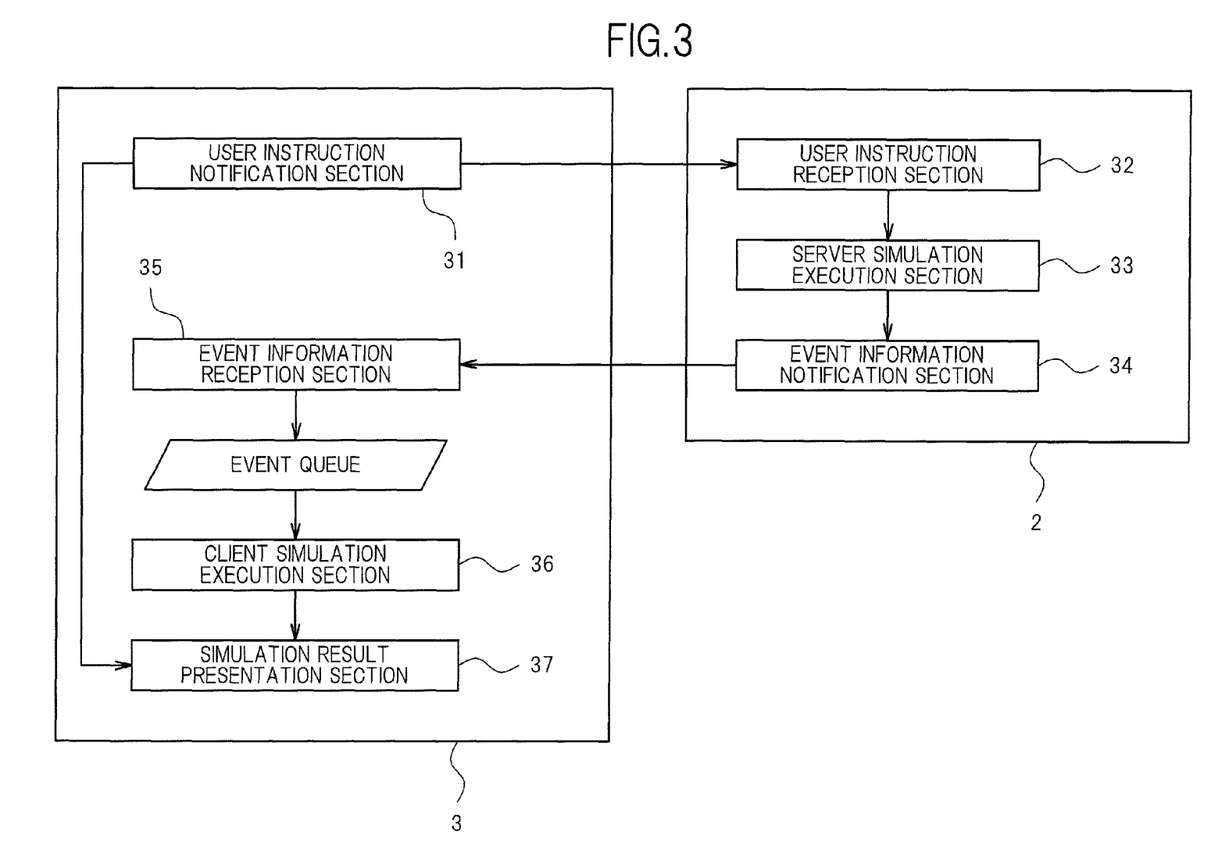
FIG. 3 A functional block diagram illustrating an example of functions implemented by the simulation system according to the embodiment of the present invention.

As illustrated in FIG. 3, in terms of functionality, the simulation system 1 includes a user instruction notification section 31, a user instruction reception section 32, a server simulation execution section 33, an event information notification section 34, an event information reception section 35, a client simulation execution section 36, and a simulation result presentation section 37. Of those functions, the user instruction reception section 32, the server simulation execution section 33, and the event information notification section 34 are implemented by the control section 11 of the server 2 executing programs stored in the storage section 12. Further, the user instruction notification section 31, the event information reception section 35, the client simulation execution section 36, and the simulation result presentation section 37 are implemented by the control section 21 of each client 3 executing programs stored in the storage section 22. Those programs may be provided via a communication network, such as the Internet, or may be provided in a state of being stored in various types of computer-readable information storage media, such as an optical disk.

The user instruction notification section 31 of the client 3 receives an instruction operation performed by the user with respect to the operation section 24. Specifically, in this embodiment, the user instruction notification section 31 receives a user's instruction for changing the behavior of an object to be subjected to the simulation, and then transmits information indicating a content of the user's instruction (hereinbelow, referred to as user message) to the server 2. For example, the user message may be information specifying a current coordinate value, moving direction, moving speed, or the like of any one of the objects disposed in the virtual space, or may be information specifying various types of actions for the object.

It should be noted that, as for a predetermined type of instruction received from the user, in order to perform an immediate display according to a content thereof, the user instruction notification section 31 may output, to the simulation result presentation section 37, a notification indicating that the instruction has been given or the same user message as has been transmitted to the server 2. The processing of the simulation result presentation section 37 which is performed according to the user's instruction is described later.

The user instruction reception section 32 of the server 2 receives the user message notified by the user instruction notification section 31 of the client 3, and then outputs the user message to the server simulation execution section 33.

Based on the user message received by the user instruction reception section 32 and various types of conditions prescribed in advance, the server simulation execution section 33 of the server 2 executes the simulation processing with regard to the behaviors of the objects disposed in the virtual space. The simulation processing may be implemented by a publicly-known physical simulation program for, for example, calculating the physical movement processes of objects or influences caused by interactions, such as a collision of objects. Through the simulation processing, every predetermined unit time tu, the values of parameters indicating the behaviors of the objects are calculated, including positions, orientations, moving speeds, rotation speeds, accelerations, or the like of the objects in the virtual space. It should be noted that the unit time tu may be, for example, a time period corresponding to a frame rate at which the client 3 renders a display screen. Hereinbelow, the elapse of time in the virtual space is represented by a value of a time counter t. Specifically, every time the time in the virtual space has elapsed by the unit time tu, the server simulation execution section 33 increments the value of the time counter t by one, and, at the same time, calculates the state of each object at the time point represented by the value of the time counter t.

The server simulation execution section 33 outputs, to the event information notification section 34, information regarding a behavior of the object, which is obtained as a result of the simulation processing, as event information to be notified to each client 3. Here, the server simulation execution section 33 outputs the event information regarding the behavior of the object along with timing information indicating a timing at which the behavior occurs (in this description, the value of the time counter t indicating the timing).

The event information to be output may indicate a change in behavior of the object that satisfies a predetermined condition. In this case, the predetermined condition relates to, for example, whether or not a predetermined parameter regarding the behavior of the object, such as a moving speed or a moving direction, has changed in the unit time tu by a value equal to or larger than a predetermined threshold. Further, the condition for outputting the event information may be determined depending on the contents of the simulation. For example, in a case where the behaviors of balls are simulated in a billiard game, it is when a ball has collided against another ball or a cushion of the billiard table that the behavior of the billiard ball changes significantly. Such an event caused by an interaction between objects has a higher risk that a small numerical error results in a significant difference in calculation results. Thus, such an event is transmitted to each client 3 as the event information, to thereby reproduce the behaviors of the objects on the side of the client 3 with high accuracy without transmitting all pieces of information regarding the behavior of the object every unit time tu to each client 3.

Further, in a case where a change in behavior occurs directly to an object through a user's instruction, unless the change in behavior is notified to each client 3, the clients 3 other than the client 3 being used by the user who has given the instruction cannot reflect such a change in behavior to the simulation results. In view of the above, the server simulation execution section 33 sets the change in behavior as event information, and treats the change in behavior as an output subject. For example, in the above-mentioned example of the billiard game, in a case where a ball is newly caused to start to move in a predetermined direction at a predetermined speed in response to the user message received by the user instruction reception section 32, the server simulation execution section 33 outputs the event information indicating the start of the movement.

Here, in this case, the server simulation execution section 33 causes the behavior of the object corresponding to the user's instruction to occur not at a timing at which the user gives the instruction regarding the behavior of the object to the client 3 but at a timing at which the user message indicating the content of the instruction is received from the client 3. Accordingly, each client 3 receives, from the server 2, not only the event information corresponding to an instruction given by a user using another client 3 but also information regarding the behavior of the object corresponding to the instruction given by the user using the corresponding client 3 itself, the instruction having been sent from the corresponding client 3 to the server 2 as described above. With this configuration, each client 3 may process, in an integrated manner, the behavior of the object corresponding to the instruction given by the user of the corresponding client 3 and the behavior of the object corresponding to the instruction given by the user of the another client 3.

The event information notification section 34 of the server 2 notifies each client 3 of a combination of the event information and the timing information which is output by the server simulation execution section 33. It should be noted that the event information notification section 34 does not necessarily need to notify all the clients 3 of each piece of the event information output by the server simulation execution section 33. As described later, each client 3 executes simulation processing similar to the simulation processing being executed by the server simulation execution section 33. However, the client 3 only needs to execute the simulation processing to an extent necessary for the client 3 itself to perform the presentation to the user, and hence the client 3 does not need to execute the entirety of the simulation processing executed by the server simulation execution section 33. Thus, based on a position at which a user object associated with a user using each of the plurality of clients 3 is disposed in the virtual space, a position of a viewpoint set in the virtual space for generating a screen to be presented to the user by the client 3, or the like, the event information notification section 34 may notify the client 3 of only the event information regarding the behaviors of objects existing within a predetermined range covering the position at which the user object is disposed, the position of the viewpoint, or the like, and vicinities of such a position.

Figure 4:
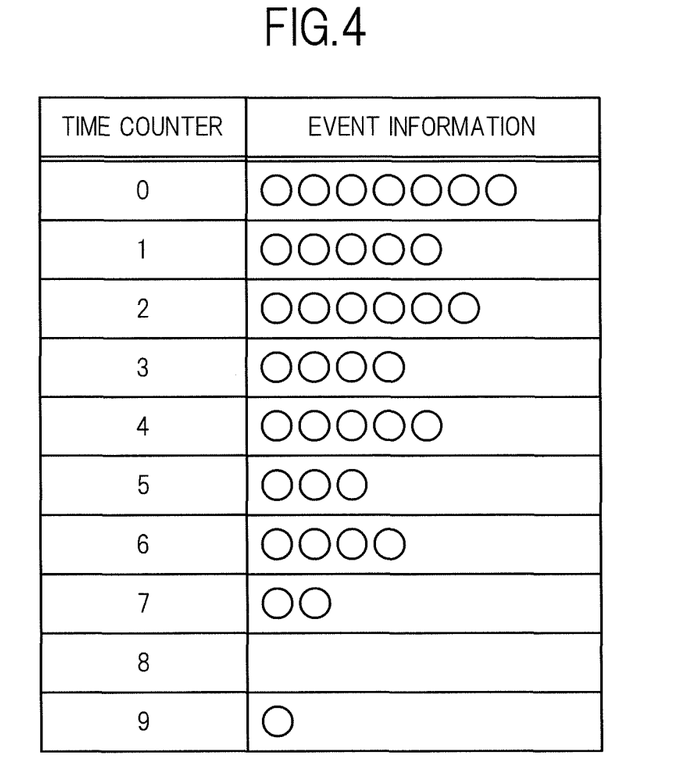
FIG. 4 A diagram illustrating an example of event queues.

The event information reception section 35 of the client 3 receives each piece of the event information notified by the event information notification section 34 of the server 2, and temporarily stores those pieces of the event information in an event queue secured within the storage section 22. In this embodiment, the event queue is separately secured for each value of the timing information (that is, time counter t) indicating a timing at which each event occurs. FIG. 4 illustrates an example of such an event queue, in which each of the circles schematically indicates an individual piece of the event information stored in the event queue. In FIG. 4, in association with a total of ten values of the time counter t (t=0 to 9), event queues are secured. Each piece of the event information transmitted from the server 2 is stored in an event queue that corresponds to the value of the time counter t which is associated with the piece of the event information.

Based on the event information stored in the event queue by the event information reception section 35, the client simulation execution section 36 of the client 3 executes simulation processing similar to the simulation processing executed by the server simulation execution section 33 with regard to behaviors of at least part of the objects disposed in the virtual space. Specifically, as described above, for example, the client simulation execution section 36 sets, as a subject range, a predetermined range covering the vicinities of the position at which the user object associated with the client 3 is disposed, the position of the viewpoint set in the virtual space for generating a display screen to be displayed in the display section 25, and the like, and executes the same type of simulation processing as the processing that is being executed by the server simulation execution section 33 with respect to the objects included within the predetermined range. It should be noted that the simulation processing executed by the client simulation execution section 36 may have less calculation accuracy than the simulation processing executed on the side of the server 2. On this occasion, the client simulation execution section 36 executes the simulation processing so that the behaviors of the objects which are indicated by the event information stored in the event queue occur.

It should be noted that, in this embodiment, the client simulation execution section 36 executes the simulation processing similar to the simulation processing by the server 2 at a timing delayed from the execution of the simulation processing by the server 2. To give a specific example, assuming that the behaviors of the objects in the virtual space are computed for the time counter t=0 by the server simulation execution section 33 at a given time point T in real time, the client simulation execution section 36 computes the behaviors of the objects for the same time counter t=0 at a timing at which a time point (T+d) delayed by a delay time d from the time point T has been reached. Here, the delay time d may be a time set in advance. Alternatively, for example, by measuring a required time necessary for data transmission from the server 2 to the client 3 in advance, the delay time d may be determined according to the required time thus measured. In this case, the server 2 may execute the measurement of the required time for data transmission with respect to the clients 3 a plurality of times, to thereby determine the delay time d according to a mean value thereof or a variance thereof, and notify each client 3 of the delay time d. Further, according to the required time of a client 3 that has taken the longest time for data communication among the clients 3 connected to the server 2, the delay time d may be determined.

It should be noted that the number of the above-mentioned event queues to be secured for each time counter is determined according to the delay time d. For example, for a number corresponding to a number (d/tu) obtained by dividing the delay time d by the unit time tu, event queues corresponding to the respective values of the time counter are prepared. With this configuration, the event information reception section 35 can queue the event information received from the server 2 during a time range determined according to the delay time d.

Further, the client simulation execution section 36 executes the simulation processing in such a manner that the behavior of an object corresponding to each piece of the event information stored in an event queue is caused to occur at a timing determined according to the value of the time counter with which the event queue is associated.

To give a specific example, the event information generated for the time counter t=0 through the simulation performed on the side of the server 2 at the time point T in real time arrives at the client 3 after a lapse of a given amount of communication time. By setting a longer time than a maximum value of this communication time as the delay time d, it is possible to prohibit the simulation for the time point t=0 from being started on the side of the client 3 until all pieces of the event information associated with the time counter t=0 finish being received. Then, all the pieces of the event information for the time point t=0, which are received by the client 3 until the time point (T+d) at which the simulation for the time point t=0 is to be started on the side of the client 3, are stored in the event queue associated with t=0. At the time point (T+d), the client simulation execution section 36 executes the simulation processing with regard to the behaviors of the objects while reflecting an event content indicated by each piece of the event information stored in the event queue associated with t=0, and then outputs information indicating states of the objects (positions, orientations, and the like of the objects at t=0), which are obtained as results of the simulation processing, to the simulation result presentation section 37.

Further, after the simulation for t=0 is executed, the contents of the event queue in which the event information for t=0 is stored become unnecessary, and hence the event information reception section 35 erases the contents of the event queue associated with t=0. Further, in place of the event queue associated with t=0, an event queue associated with a next value of the time counter t (in the example of FIG. 4, t=10), for which the event queue is not secured yet within the storage section 22, is newly secured. Through the repetition of such processing as described above every unit time tu, the client simulation execution section 36 of the client 3 executes, with a delay of the delay time d compared to the server simulation execution section 33, at least part of the simulation processing executed by the server simulation execution section 33 while reflecting the contents of the event information received from the server 2 during the last time period of d.

With this configuration, the client simulation execution section 36 can execute the simulation processing based on the assumption that the events occurring in the simulation on the side of the server 2 occur in the same order and time interval as the order and time interval in which the events occur on the side of the server 2, regardless of the timings at which the pieces of the event information arrive at the client 3. In particular, the simulation processing is executed based on the assumption that a plurality of events occurring at the same timing on the side of the server 2 occur at the same timing regardless of variations in timings at which the pieces of the event information arrive at the client 3. As a result, it becomes possible for the client simulation execution section 36 to reproduce the behaviors of the objects while reducing a deviation from the behaviors of the objects which are determined through the simulation processing by the server simulation execution section 33.

The simulation result presentation section 37 of the client 3 displays, on the screen of the display section 25, an image showing the behaviors of the objects which are obtained as results of the simulation processing performed by the client simulation execution section 36, to thereby present the image to the user. Specifically, the simulation result presentation section 37 updates the display every unit time to according to processing results of the client simulation execution section 36, to thereby present to the user the behaviors of the objects which are similar to the results of the simulation executed by the server simulation execution section 33.

Hereinbelow, with reference to FIG. 5, description is given of a specific example of the simulation processing executed by the simulation system 1 according to this embodiment. Here, similarly to FIG. 6, a billiard game is used as an example, in which three balls B1, B2, and B3 are disposed within a billiard table serving as a virtual space. Further, similarly to FIG. 6, rectangular areas on the left-hand side of the drawing sheet represent simulation results obtained by the server 2, and rectangular areas on the right-hand side of the drawing sheet represent simulation results obtained by the client 3.

Figure 5:
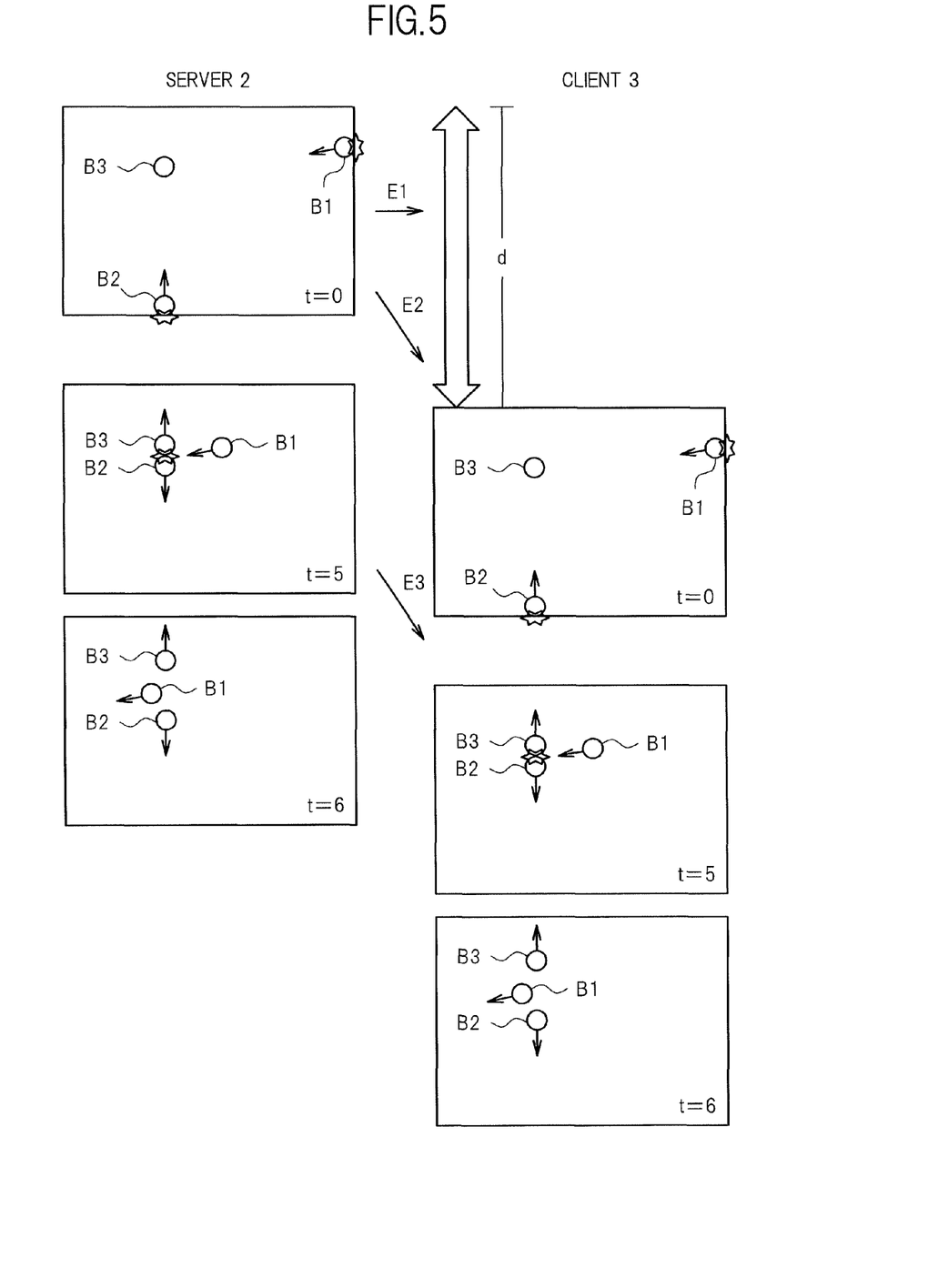
FIG. 5 A diagram illustrating an example of simulation results obtained by the simulation system according to the embodiment of the present invention.

In the example of FIG. 5, first, at a timing of the time counter t=0, the server simulation execution section 33 of the server 2 outputs pieces of event information which indicate an event E1, in which the ball B1 collides against a wall and bounces back, and an event E2, in which the ball B2 starts to move according to a user's instruction, respectively. Here, there occurs a deviation between the times at which the pieces of the event information arrive at the client 3, but both the pieces of the event information are stored in the event queue associated with t=0. It should be noted that the wide arrow illustrated in the figure indicates a period in which buffering into the event queue associated with t=0 is performed. At a timing at which the delay time d has elapsed after the time point of the execution of the simulation for t=0 by the server 2, the client simulation execution section 36 of the client 3 executes a simulation for t=0 based on the two pieces of the event information stored in the event queue associated with t=0. With this configuration, also in the simulation processing of the client 3, the event E1 and the event E2 occur at the same timing, and, through the physical simulation executed separately on the side of the client 3, the subsequent movements of the balls are also sequentially calculated, similarly to the simulation results obtained on the side of the server 2.

After that, when an event E3 in which the ball B2 and the ball B3 collide against each other occurs at a timing of t=5 on the side of the server 2, event information indicating a content of the event is transmitted to the client 3. Similarly to the case of the event E1 and the event E2, this event information is also stored temporarily in an event queue associated with t=5 at the client 3, and an event content thereof is not reflected immediately on the simulation processing performed by the client simulation execution section 36. After that, when the client simulation execution section 36 executes the simulation processing for t=5, the content of the event E3 is reflected. As a result, a result similar to the simulation result obtained on the side of the server 2 is also generated at the timing of t=5 on the side of the client 3. It should be noted that, even in a case where there occurs a deviation between the simulation on the side of the server 2 and the simulation on the side of the client 3 for such a reason as the event information taking time equal to or longer than the delay time d to arrive, this deviation may be corrected by reflecting the contents of event information arriving later from the server 2 on the simulation on the side of the client 3.

Here, in a case where event information associated with a value of the time counter t, which indicates a timing for which the client simulation execution section 36 has already executed the simulation, arrives because the data transmission has taken more time than the delay time d set in advance due to a status of a communication line between the server 2 and the client 3 or other such factor, the client 3 may execute such processing as described below. Specifically, the event information reception section 35 immediately outputs the received event information to the client simulation execution section 36 without storing the event information in an event queue, and the client simulation execution section 36 immediately reflects the content of the event information on the simulation processing that is being executed at the current time point. Further, the client simulation execution section 36 may perform a correction so that the delay time d is lengthened, and the number for the time counter t for securing the event queues may be increased. Further, the simulation processing may be executed in such a manner that time within the virtual space temporarily elapses more slowly. Further, in a game in which a plurality of users participate, there is a case in which it is desired that the delay time d for each client 3 be made identical in order to ensure fairness between users. Thus, in this case, an instruction to perform a correction on the delay time d may be given to the clients 3 via the server 2, thereby allowing the other clients 3 to execute similar corrections.

Further, if any one of the server 2 and the client 3 has taken more time than expected to execute the simulation processing due to a processing load or the like, there may occur a deviation between the server 2 and the client 3 in value of the time counter t in the simulation processing due to other factors than the delay time d set in advance. Specifically, in a case where the simulation on the side of the server 2 is delayed compared to the simulation on the side of the client 3, each client 3 may temporarily delay the elapse of time in the virtual space similarly to the above-mentioned correction of lengthening the delay time d. Conversely, in a case where the simulation on the side of the client 3 is delayed compared to the simulation on the side of the server 2, there is a possibility that event information associated with a time counter value for which the event queue is not secured yet arrives at the client 3. In a case where such event information has arrived, the client 3 temporarily stores such event information in a reserved event queue, and, at the same time, the elapse of time in the virtual space may be temporarily made faster in the simulation processing performed by the client simulation execution section 36. After that, if the event information associated with the time counter value for which the event queue is not secured has ceased coming, it is judged that the progress of the simulation processing has returned to the normal state. Accordingly, the use of the reserved event queue may be stopped, and the elapse of time in the virtual space may be returned to the normal state.

In this manner, in the simulation system 1 according to the embodiment described above, the client 3 queues the event information transmitted from the server 2 for a duration of the delay time d, and executes the simulation with a delay compared to the side of the server 2 in such a manner that events occur at timings corresponding to the timing information notified along with the event information. As a result, a deviation in simulation results which occurs between the server 2 and the client 3 may be reduced.

It should be noted that, in the simulation system 1 according to this embodiment, an image of the simulation result which is to be presented to the user by the simulation result presentation section 37 becomes delayed by the delay time d compared to the execution of the simulation processing performed by the server 2. For this reason, for example, even if the user operates the operation section 24 at a given timing in response to the image displayed in the display section 25, to thereby give an operation instruction with respect to a displayed object, a content thereof is reflected on the simulation result of the server 2 with a delay having an amount obtained by adding the delay time d and a required communication time a taken by the user message indicating the content of the instruction to arrive at the server 2.

To give a specific example, assuming that the user gives an operation instruction with respect to an object at a timing at which a simulation result for t=n is displayed, at that time point, the server 2 is executing the simulation processing for a timing of t=n+(d/tu). Accordingly, when the event information indicating the content of the user's instruction has arrived at the server 2 from the client 3 after the required communication time a, the simulation processing for a subsequent timing (specifically, timing of t=n+(d+α)/tu) is being executed, and hence the event corresponding to the user's instruction is regarded to have occurred at that timing. In other words, the content of the instruction is reflected with a delay from the user's perception that the operation instruction has been given at the time point of t=n.

In view of the above, in this embodiment, prior to the presentation of a simulation result according to the content of the instruction, the client 3 may perform a predetermined display that is different from the simulation result according to the user's instruction so as to prevent the user from having a feeling of discomfort resulting from such a delay. This display may be performed in an overlapping manner with a display of a result of the simulation, which is being performed by the simulation result presentation section 37 at the time point at which the user's instruction is given. Specifically, upon reception of an operation performed by the user with respect to the operation section 24, the user instruction notification section 31 transmits a user message corresponding to the operation to the server 2, and also, in a case where the operation is a predetermined operation, outputs the content of the user message to the simulation result presentation section 37 as well. In response to the user message, the simulation result presentation section 37 starts to display a predetermined moving image in an overlapping manner with a display image presenting a simulation result at that time point. The moving image may be a moving image for a time duration corresponding to the delay time d. Further, the moving image may be displayed in an overlapping manner at a location within the image at which a simulation result regarding an object for which the instruction operation has been performed by the user is being displayed. Further, at a timing at which, after the event information relating to the object for which the user's instruction has been given is used for the simulation processing of the client simulation execution section 36, a result thereof is presented, the simulation result presentation section 37 may change the content of the moving image or may terminate the display of the moving image.

Specifically, taking the example of the billiard game described above, description is given of an example of the moving image used when the user has performed an instruction operation for causing a ball to start moving. In this case, the client 3 transmits a user message indicating the content of the instruction operation to the server 2, and also, according to the position of the ball for which the instruction operation has been performed and a direction specified by the user's instruction, causes a moving image showing a moving cue stick to be displayed on the screen of the display section 25. The moving image used at this time may be a moving image showing a movement in which a cue stick moves away from the ball of the instruction subject for a while, and then strikes the ball. Alternatively, at the time point of reception of the user's instruction, first, the client 3 may display only a moving image in which the cue stick moves in a direction of moving away from the ball as a predetermined moving image. In this case, the client 3 receives the event information corresponding to the user message transmitted to the server 2, and, at a timing of displaying a simulation result indicating start of movement of the ball, which is specified according to the event information, further displays a moving image showing the movement in which the cue stick strikes the ball, in synchronization with the start of movement of the ball. With the above-mentioned control, despite a time lag occurring between the instruction operation performed by the user and the reflection of the content thereof on the simulation result, it is possible to realize such rendering that prevents the time lag from causing an unnatural feeling without hindering the simulation processing delayed by the delay time d.

It should be noted that the present invention is not limited to the embodiment described above. For example, in the description given above, the plurality of clients 3 are connected to the server 2, but only one client 3 may be connected to the server 2. Further, the type of simulation to be executed by the server 2 and the client 3 is not limited to the physical simulation, and various types may be employed.

The invention claimed is:

1. A simulation system, comprising:
a client; and
a server, wherein:
the server comprises:
server simulation execution means for executing a simulation regarding behaviors of one or a plurality of objects disposed in a virtual space; and
event information notification means for notifying the client of event information regarding a behavior of the object, the event information indicating a change in behavior of the object that satisfies a predetermined condition and is obtained as a result of the simulation, along with timing information indicating a timing of the behavior, the change in behavior being a physical movement caused by an interaction between the object and another one of the plurality of objects in the simulation;
the client comprises:
event information reception means for receiving the event information notified from the server; and
client simulation execution means for executing, based on the received event information, a simulation regarding behaviors of at least part of the one or the plurality of objects in the virtual space; and
simulation result presentation means for presenting, to a user, an execution result of the simulation executed by the client simulation execution means;
wherein:
the client simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information; and
the simulation result presentation means, in a case where an instruction of the user has been received, displays a predetermined image according to the received instruction prior to presentation of a simulation result corresponding to the received instruction.

2. The simulation system according to claim 1, wherein:
the event information reception means stores each piece of the received event information in, of a plurality of event queues each secured for each piece of the timing information, an event queue corresponding to the timing information received along with the event information; and
the client simulation execution means executes the simulation for each of the plurality of event queues in a manner that behaviors of the objects occur at the same timing, the behaviors of the objects corresponding to a plurality of pieces of the event information which are stored in the each of the plurality of event queues.

3. The simulation system according to claim 1, wherein:
the client further comprises user instruction information notification means for receiving the instruction from the user regarding a behavior of any one of the one or the plurality of objects, and notifying the server of user instruction information indicating a content of the instruction from the user;
the server simulation execution means causes the behavior of the object corresponding to the user instruction information to occur at a timing of receiving the notified user instruction information from the client; and
the event information notification means notifies the client of event information regarding the behavior of the object corresponding to the notified user instruction information, along with timing information indicating a timing at which the server simulation execution means receives the user instruction information.

4. The simulation system according to claim 2, wherein the plurality of event queues are secured for a number corresponding to a time duration by which the execution of the simulation by the client is delayed compared to the execution of the simulation by the server.

5. The simulation system according to claim 1, wherein the client simulation execution means delays, compared to the execution of the simulation by the server, the execution of the simulation regarding the at least part of the one or the plurality of objects by a time duration determined according to a required time taken for data transmission from the server to the client.

6. A client, which is connected to a server for executing a simulation regarding behaviors of one or a plurality of objects disposed in a virtual space, the client comprising:
event information reception means for receiving event information regarding a behavior of the object, the event information indicating a change in behavior of the object that satisfies a predetermined condition and is obtained as a result of the simulation, along with timing information indicating a timing of the behavior from the server, the change in behavior being a physical movement caused by an interaction between the object and another one of the plurality of objects in the simulation;
simulation execution means for executing, based on the received event information, a simulation regarding behaviors of at least part of the one or the plurality of objects in the virtual space; and
simulation result presentation means for presenting, to a user, an execution result of the simulation executed by the simulation execution means;
wherein:
the simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information; and
the simulation result presentation means, in a case where an instruction of the user has been received, displays a predetermined image according to the received instruction prior to presentation of a simulation result corresponding to the received instruction.

7. A control method for a client connected to a server for executing a simulation regarding behaviors of one or a plurality of objects disposed in a virtual space, the control method for a client comprising:
an event information reception step of receiving event information regarding a behavior of the object, the event information indicating a change in behavior of the object that satisfies a predetermined condition and is obtained as a result of the simulation, along with timing information indicating a timing of the behavior from the server, the change in behavior being a physical movement caused by an interaction between the object and another one of the plurality of objects in the simulation;
a simulation execution step of executing, based on the received event information, a simulation regarding behaviors of at least part of the one or the plurality of objects in the virtual space; and
a simulation result presentation step of presenting, to a user, an execution result of the executed simulation;
wherein:
the simulation execution step comprises executing the simulation regarding the behaviors of the at least part of the one or the plurality of objects at a timing delayed from the execution of the simulation by the server, and causing the behavior of the object corresponding to the event information to occur at a timing determined according to the timing information notified along with the event information; and
the simulation result presentation step comprises, in a case where an instruction of the user has been received, displaying a predetermined image according to the received instruction prior to presentation of a simulation result corresponding to the received instruction.

8. A tangible, non-transitory computer-readable information storage medium having a program stored therein, the program causing a client, which is connected to a server for executing a simulation regarding behaviors of one or a plurality of objects disposed in a virtual space, to function as:
event information reception means for receiving event information regarding a behavior of the object, the event information indicating a change in behavior of the object that satisfies a predetermined condition and is obtained as a result of the simulation, along with timing information indicating a timing of the behavior from the server, the change in behavior being a physical movement caused by an interaction between the object and another one of the plurality of objects in the simulation;
simulation execution means for executing, based on the received event information, a simulation regarding behaviors of at least part of the one or the plurality of objects in the virtual space; and
simulation result presentation means for presenting, to a user, an execution result of the simulation executed by the simulation execution means;
wherein:
the simulation execution means executes the simulation regarding the behaviors of the at least part of the one or the plurality of objects at a timing delayed from the execution of the simulation by the server, and causes the behavior of the object corresponding to the event information to occur at a timing determined according to the timing information notified along with the event information; and
the simulation result presentation means, in a case where an instruction of the user has been received, displays a predetermined image according to the received instruction prior to presentation of a simulation result corresponding to the received instruction.

* * * * *